Oct. 11, 1927.

C. W. BECK 1,644,665

AUTOMOBILE CAN HOLDER

Filed Nov. 9, 1925

Inventor
Charles W. Beck
By
Attorney

Patented Oct. 11, 1927.

1,644,665

UNITED STATES PATENT OFFICE.

CHARLES W. BECK, OF TOLEDO, OHIO, ASSIGNOR TO THE BECK-FROST CORPORATION, OF DETROIT, MICHIGAN, A CORPORATION OF MICHIGAN.

AUTOMOBILE CAN HOLDER.

Application filed November 9, 1925. Serial No. 67,722.

My invention has for its object to produce an oil can holder or bracket for automobiles wherein a convenient means that may be made at a low cost of production is used for retaining the can in position notwithstanding the vibration or shaking that the movement of the automobile over the road will subject the can to.

The invention may be contained in can holders that differ in the details of their parts and to illustrate a practical application of the invention I have selected a can holder as an example of can holders containing my invention and shall describe it hereinafter. The can holder selected is shown in the accompanying drawing.

Figure 1:
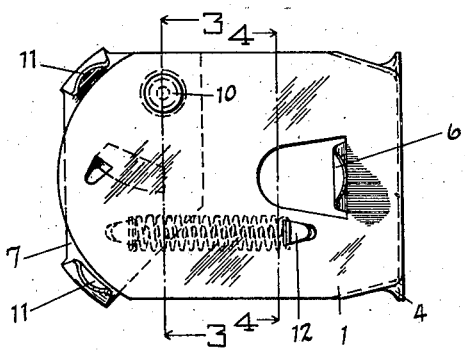
Figure 3:
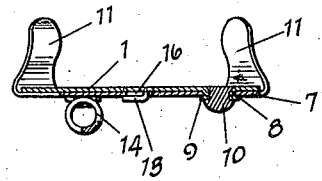
Figure 2:
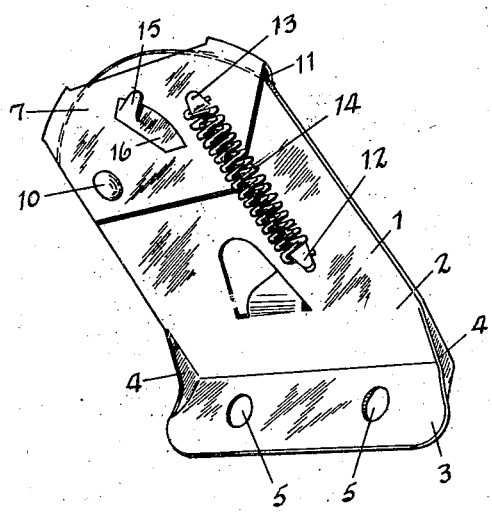
Figure 4:
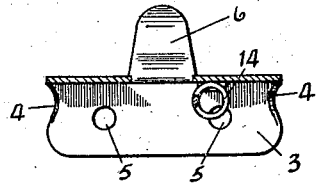

Figure 1 is a top view of the can holder. Fig. 2 is a perspective view of the bottom of the can holder. Fig. 3 is a view of a section taken on the plane of the line 3—3 indicated in Fig. 1. Fig. 4 is a view of a section taken on the plane of the line 4—4 indicated in Fig. 1.

The oil can holders embodying my invention are so constructed that they may be made at a low cost of production and consequently they are formed of sheet metal that may be die pressed and readily assembled. The construction, however, is such that the can will be efficiently held notwithstanding the fact that it may be cheaply made and assembled by cheap labor. The holder is preferably in the form of a bracket. It has a main supporting member 1, that may be shaped to rigidly sustain the relation of its parts notwithstanding the load that it carries and the shaking that it is subjected to. It is bent to form right angular portions 2 and 3, the part forming the shelf for supporting the oil can, and the part 3 for securing the bracket to some part of the automobile such as the dash. The holder is so shaped as to form the brace portions 4 that increase the rigidity of the shelf 2 with respect to the part 3 and so that when the part 3 is secured in position, as on the back of the dash, the shelf 2 will be rigidly held in position. The bracket is secured in position by suitable bolts or screws that will be passed through the holes 5.

An elastic finger or ear 6 may be struck up from the sheet metal that forms the shelf portion 2. The bracket also has the part 7 which is located on the underside of the shelf portion 2 and pivotally connected to the part 1. The oil can is thus placed on the top of the shelf portion leaving the pivoted member free to rotate on its pivot to adjust itself to the size of the bottom of the can. An opening is formed in one corner of the part 1, and, in forming the opening, a flange 8 is depressed around the opening while the part 7 is formed with an opening at one end which receives the flange 8. A washer 9 is placed over the openings and a rivet 10 is inserted through the washer 9 and the parts 1 and 7. The flange 8 thus forms a spacing means to maintain the washer 9 in spaced relation with respect to the part 1 and so that the part 7 will not be too tightly clamped by the rivet 10 to permit angular movements of the part 7.

The part 7 is provided with a pair of fingers or ears 11 that extend upwards and are located in opposition to the finger or ears 6 and so that the can will be engaged at three points by the fingers or ears 6 and 11. The fingers 6 and 11 are bent inward and outward to permit the can to be readily inserted and elastically gripped by the fingers or ears. In order to provide for cans of different sizes and in order to elastically grip the cans notwithstanding variations in their sizes, the pivoted member 7 is elastically drawn so as to cause one of the fingers 11 to approach closer to the finger 6. The member 1 is provided with an ear 12 that protrudes from the bottom of the bracket and the part 7 is also provided with the ear 13 and a tension spring 14 is connected to the ears 12 and 13 so as to draw the pivoted member 7 and cause one of the ears 11 to approach the ears 6 and engage the can at the three points around its lower edge with the same clamping action notwithstanding the variations in the size of the different cans that may be placed on the bracket. In order to sustain the free end of the member 7 and prevent its depression by insertion of the can, a finger or ear 15 may be struck from the part 1 and a slot 16 may be struck out of the part 7. One edge of the slot 16 may be made arcuate in form, the center of the arc being at the center of the rivet 10 and the finger 15 may be located so as to engage the portion of the member 7 along the arcuate edge. When, therefore, the can is placed in position the finger 15 will engage the member 7 to prevent the pressure from being transmitted to the rivet and thus prevent the member from being torn from the rivet by downward movement of the member. In assembling the parts all that is necessary is to place the member 7 in position such that the finger 15 will extend through the slot 16 when it is riveted in position and the spring is then connected to the ears 12 and 13.

I claim:

An oil can bracket having a shelf for supporting the oil can, a plate pivotally connected to the shelf and located below the shelf, a pair of clamping ears struck up from the plate and extending to a point above the shelf to engage the side of the oil can, the shelf having an ear struck upwards to engage a side of the oil can at a third point, the plate having an arcuate slot and the shelf having an ear extending through the said slot and laterally beneath the edge of the plate along the slot for supporting the plate against a downward thrust, a spring elastically connecting the plate and the shelf and located below the shelf.

In testimony whereof I have hereunto signed my name to this specification.

CHARLES W. BECK.